United States Patent [19]

Yamaguchi et al.

[11] 4,357,825
[45] Nov. 9, 1982

[54] KNOCK DETECTING APPARATUS FOR INTERNAL COMBUSTION ENGINES

[75] Inventors: Hiroaki Yamaguchi, Anjo; Tadashi Hattori; Yoshinori Ootsuka, both of Okazaki, all of Japan

[73] Assignee: Nippon Soken, Inc., Nishio, Japan

[21] Appl. No.: 168,447

[22] Filed: Jul. 10, 1980

[30] Foreign Application Priority Data

Jul. 16, 1979 [JP] Japan ................................ 54/90858

[51] Int. Cl.³ .................................................. G01L 23/22
[52] U.S. Cl. ............................................... 73/35; 73/651
[58] Field of Search ............................ 73/35, 651, 654; 123/425, 435; 310/25

[56] References Cited

U.S. PATENT DOCUMENTS

| | | | |
|---|---|---|---|
| 2,275,675 | 3/1942 | Draper et al. | 73/35 |
| 2,300,638 | 11/1942 | Wente | 310/25 X |
| 2,319,219 | 5/1943 | Draper et al. | 35/ |
| 2,424,864 | 7/1947 | Treseder | 73/651 |
| 4,254,354 | 3/1981 | Keem | 73/35 X |
| 4,275,586 | 6/1981 | Gast et al. | 73/35 |

FOREIGN PATENT DOCUMENTS 2731069  1/1979  Fed. Rep. of Germany .......... 73/35

Primary Examiner—James J. Gill
Attorney, Agent, or Firm—Cushman, Darby & Cushman

[57] ABSTRACT

A knock detecting apparatus for internal combustion engines includes a housing of a predetermined shape containing therein magnetic circuit means a part of which is formed by vibrating plate means made of a magnetic material and magnetic flux sensing means for sensing a change in the magnetic reluctance of the magnetic circuit means caused by the vibration of the vibrating plate means in resonance with a knocking frequency.

7 Claims, 15 Drawing Figures

KNOCK DETECTING APPARATUS FOR INTERNAL COMBUSTION ENGINES

BACKGROUND OF THE INVENTION

The present invention relates to a knock detecting apparatus adapted for use with internal combustion engine ignition timing control systems, etc. More particularly, the present invention is directed to such systems which are designed to control engine timing so that knock, detected from the vibrations produced outside the engine cylinders due to the cylinder pressure, is controlled to a desired intensity.

As is well known in the art, there is a close correlation between ignition timing and cylinder pressure. When an air-fuel mixture is exploded, in the absence of knocking there is no superposition on the cylinder pressure of any higher harmonic component. This higher component usually has a frequency in the range of 5 to 10 kHz which falls in the frequency band determined by the cylinder bore diameter and the velocity of sound in the combustion and which is caused by the intermittent and rapid combustion) If knocking starts to occur such higher harmonic component starts to superpose on the cylinder pressure at around the maximum cylinder pressure value and this results in the generation of vibrations or sound outside the cylinders. Careful examination of the pressure signals generated inside the cylinders and the generation of vibrations or sound outside the cylinders shows that the beginning of knocking (trace knock) starts to occur at an engine crank angle at which the cylinder pressure attains the maximum value and that as the knock intensity gradually increases (to light knock and heavy knock) the higher harmonic component starts to superpose considerably earlier (or on the ignition side) than the maximum cylinder pressure crank angle. While the engine efficiency will be increased greatly if the vibrations or sound emitted to the outside of the cylinders by the knocking is detected accurately and fed back so as to control the ignition timing, there has been in fact no detecting apparatus capable of operating stably under severe environmental conditions in which vehicles are run.

A known detecting apparatus of the above type employs a piezoelectric element type acceleration detector for the purpose of detecting the engine vibrations due to knocking. However, this type of knock detecting apparatus has many deficiencies with respect to the following essential requirements for engine knock detecting apparatus.

(1) Since the engine knock increases as the ignition timing is advanced as mentioned previously, the desired knock control level for ignition timing controlling purposes must be lower than the trace knock level and a highly accurate and stable detecting characteristic is an essential requisite. However, the piezoelectric element is such that its impedance is essentially high, its characteristics tend to be affected by humidity and contamination and it is difficult to generate stably a small signal indicative of the trace knock (namely, the element is large in drift and amplitude variation). Further, while the piezoelectric properties of the element are provided by polarization, due to the fact that the element is used under severe conditions which cyclically change through high temperature to low temperature conditions, this polarization tends to be lost gradually with the resulting decrease in the sensitivity. The decreased sensitivity causes a rise in the knock control level which in turn causes damages to the engine due to the knock.

(2) It is desirable that the detecting apparatus is inexpensive to manufacture. However, since the piezoelectric element has a high impedance, its output signal must be amplified by means of an expensive amplifier of the high impedance input type which is called as a charge amplifier. Also, the high impedance type amplifier tends to malfunction under the effects for example of noise due to the ignition signals of an engine and the prevention of such malfunction requires the provision of a more expensive and complicated construction.

(3) The use of the piezoelectric element as a vehicle-mounted sensor involves many problems from the standpoint of durability, cost, etc., in that it is low in shock resistance, tends to produce cracks, breaking or the like and requires the use of cooling means when used in high temperature conditions.

SUMMARY OF THE INVENTION

With a view to overcoming the foregoing deficiencies in the prior art, it is the object of the present invention to provide an improved knock detecting apparatus comprising magnetic path means including vibrating means made of magnetic material and secured to its central magnetic path portion and a gap formed between the vibrating magnetic material and a housing, magnetic flux sensing means and the housing of substantially cylindrical shape for accommodating the magnetic path means and the sensing means, whereby making it easy to adjust the resonant frequency of the vibrating means to knocking harmonics, remarkably improving the sensitivity of the detecting apparatus to the knocking frequency, relatively decreasing the detection sensitivity to the vibration noise unavoidably caused by the engine body (e.g., vibrations caused by valve seating) thus improving the S/N ratio and making possible the detection of very low knock levels, making it possible, due to the apparatus being operated magnetically, to use as its component parts a coil, magnet and others having excellent environmental resistance, ensuring sufficient resistance properties under severe use conditions of vehicles, ensuring stable operation without any deterioration of the characteristics, preventing cracking and breaking of the elements and ensuring sufficient mechanical strength, making it possible to use such magnetic property sensitive element as a coil or magneto-resistance element for signal sensing purposes thus replacing the high impedance piezoelectric element with a low impedance sensing means, and thereby practically eliminating the effects of moisture, etc., ensuring excellent stability against electrical noise, such as, ignition noise, ensuring simplification in construction and reduction in size, and making it possible to use inexpensive and mass-produced materials, thus ensuring an apparatus which is high in efficiency, low in cost and light in weight.

DESCRIPTION OF THE PREFERRED EMBODIMENTS

The present invention will now be described in greater detail with reference to the illustrated embodiments.

Figure 1:
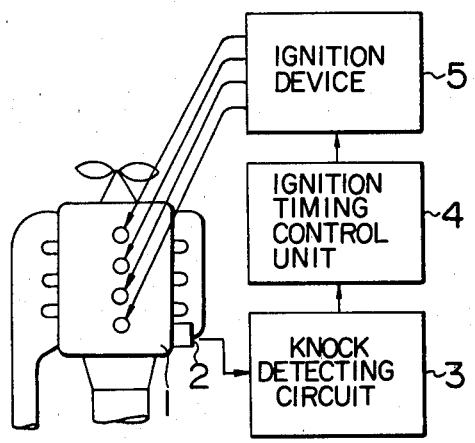
FIG. 1 is a schematic block diagram showing the construction of a knock feedback ignition system incorporating a knock detecting apparatus according to the present invention.

Referring first to FIG. 1, there is illustrated the construction of a knock feedback ignition system incorporating a knock detecting apparatus according to the invention. In the Figure, numeral 1 designates a four-cylinder inline-type internal combustion engine, and a knock detecting apparatus 2 is secured to the cylinder block of the engine 1 by means of a screw or the like. Numeral 3 designates a knock detecting circuit for detecting knocking of the engine 1 from the output signal of the knock detecting apparatus 2, and 4 an ignition timing control unit responsive to the output signal of the detecting circuit 3 to advance or retard the ignition timing to the optimum ignition position. The output signal of the control unit 4 is supplied by way of a known type of ignition device 5 to the spark plugs mounted in the engine 1 so as to ignite the air-fuel mixture. The knock detecting circuit 3 used in this ignition system detects the ignition signal which is not shown, so that the noise components caused by the engine vibrations are sampled by means of the output of the detecting apparatus 2 during a predetermined time interval or predetermined degrees of crankshaft rotation immediately following the ignition where there is no occurrence of knock and the result is compared with the output of the detecting apparatus produced during a predetermined time interval or predetermined angle of crankshaft rotation following the top dead center (TDC) or following the peak cylinder pressure where there is an increased tendency to knock (the output may be replaced by its integrated or averaged value), thereby detecting the presence of knocking. Alternatively, the presence of knocking may be determined by a probability method instead of depending on only a single signal. For example, the presence of knocking may be determined by the percentage of knocking events occurred to every 100 times of ignition. The ignition timing control unit 4 is responsive to the thus determined presence or absence of knocking so as to advance or retard the ignition timing. While the detailed construction of the knock detecting circuit 3 and the ignition timing control unit 4 are known in the art and will not be described, it should be apparent that the detecting apparatus of this invention can be used with any of the known systems provided that the occurrence of knock is detected to thereby control the ignition timing.

Figure 2A:
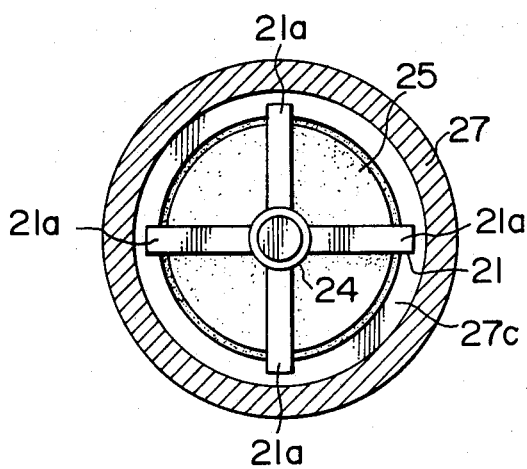
FIGS. 2A and 2B are respectively a cross-sectional view and longitudinal sectional view showing a first embodiment of the apparatus according to the invention.
Figure 2B:
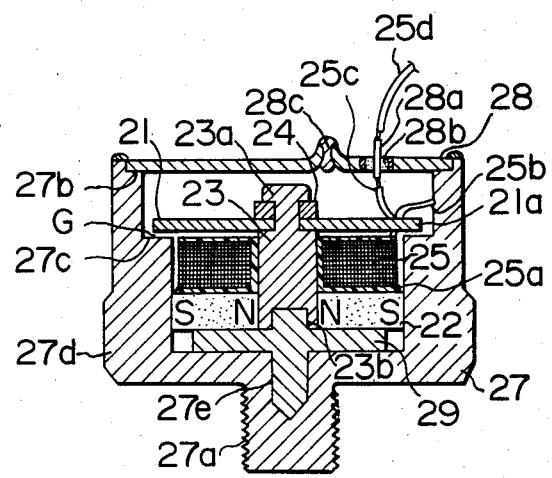

Next, the knock detecting apparatus of this invention will be described in greater detail. In the first embodiment shown in FIGS. 2A and 2B, numeral 21 designates a plate type vibrating member made of a magnetic material (e.g., iron or iron-nickel alloy) comprisng four integrally formed vibrating reeds 21a which are separately extended radially and having resonant frequencies in the knocking frequency range of 5 to 10 Hz. Numeral 22 designates a disk magnet made of a material such as alnico or ferrite and having a magnetic force, which is magnetized along the inner and outer peripheries of the disk so that a north pole is formed on the center side and a south pole is formed on the outer side. Numeral 23 designates a bar magnetic member made of a material such as iron or iron-nickel, formed into a longitudinally extended cylindrical shape and including a caulking portion 23a and a driving recess 23b at its ends thus forming the central magnetic path portion of a magnetic path. The lower end of the magnetic member 23 is fitted in the center hole of the magnet 22, and the vibrating member 21 and a washer 24 are integrally secured by caulking to the caulking portion 23a of the magnetic member 23 which is extended through the center hole of the vibrating member 21. Numeral 25 designates a coil wound on a bobbin 25a through the center of which the bar magnetic member 23 is extended and having outputs such that one end 25b is fastened firmly by soldering, caulking or spot welding to the inner surface of a cup-shaped housing 27 and the other end 25c is brought to the outside through a sealing plate 28 fitted in the open end of the housing 27. Numeral 29 designates a supporting member made of a nonmagnetic material such as aluminum, copper alloy or stainless steel which is firmly driven into the driving recesses 27e and 23b of the housing 27 and the magnetic member 23 therebetween so as to provide a suitable space between the bottom surfaces of the magnet 22 and the housing 27. Since the supporting member 29 is made of nonmagnetic material, it is designed in an optimum manner so that the magnetic reluctance effectively has a sufficiently large valve which is close to the air gap. The side peripheral wall of the housing 27 is formed into substantially a cylindrical shape and it is made of a magnetic material such as iron or iron-nickel alloy. The housing 27 includes a threaded portion 27a formed in the lower part for fastening the apparatus to the cylinder block, a stepped portion 27c adapted to form a gap G between it and the outer end of the vibrating reeds 21a, a stepped portion 27b for sealing the detecting apparatus and a wrench hexagon portion 27d for fastening the housing 27 to the engine block. Of these component parts, those made of magnetic material may sometime be plated with magnetic material such as nickel or cobalt if they have a tendency to rust. The sealing plate 28 is provided to hermetically seal the detecting apparatus and protect it against the moisture of the outside air, contamination, etc., and it is made of a nonmagnetic material such as stainless steel. The plate 28 includes a sealed terminal 28b (usually called as a hermetic seal in which a center electrode 28a and the plate 28 are insulated from each other by glass fused in a high temperature furnace) for taking out an output signal, and a hole 28c through which an inert gas such as nitrogen gas or argon is introduced. The output terminal 25c of the coil 25 is connected to the center electrode 28a of the sealed terminal through which it is connected to an external signal line 25d. The sealing of gas is accomplished by first placing the entire detecting apparatus in vacuum to remove the inside air, introducing nitrogen gas or nitrogenargon mixture to about 1 atmosphere and then sealing the opening 28c by welding or soldering. Also, a sufficient sealing is provided between the outer periphery of the plate 28 and the housing 27 by means of argon welding or soldering or by inserting a sealing ring between the plate 28 and the housing 27 and then caulking them. With the thus constructed detecting apparatus, a magnetic path is formed by the north pole of the magnet 22, the magnetic member 23, the vibrating member 21, the gap G, the housing 27 and the south pole of the magnet 22. Thus, in the present embodiment the magnetic member 23 forms a central magnetic path portion, the magnet 22 forms a radial magnetic path portion and the outer peripheral wall of the housing 27 forms an outer peripheral magnetic path portion. In order to prevent the magnetic flux in the magnetic path from varying due to a change in the relative position of the coil 25, the magnet 22 and the magnetic material 23, the bobbin 25a is firmly attached by adhesion or the like to the magnetic member 23 and the magnet 22.

With the construction described, the operation of the detecting apparatus is as follows. As mentioned previously, the detecting apparatus 2 is firmly fastened to the cylinder block by screwing the threaded portion 27a thereinto. As a result, the vibrations produced in the cylinder block by knocking are transmitted to the vibrating member 21 by way of the housing 27, the supporting member 29 and the magnetic member 23. Since the vibrating member 21 has its central portion firmly secured in place, the vibrating member 21 vibrates in response to the frequency and intensity of the engine vibration as well as its natural frequency. In this case, since the component parts other than the vibrating member 21 are firmly mounted in place so as to move together with the housing 27, the vibrating member 21 alone vibrates in the magnetic path so that the gap varies and the reluctance in the magnetic path varies, thus causing the coil 25 to generate a voltage output corresponding to the change in the magnetic flux. Since the one end 25b is grounded to the housing 27, this output signal is applied to the detecting circuit 3 from the other end 25c through the center electrode 28a of the sealed terminal 28b and the single signal line 25d. In this case, all the magnetic flux produced by the magnet 22 does not flow through the previously mentioned magnetic path (due to the leakage of some magnetic flux to the outside) and thus the materials and spaces for the respective component parts are suitably selected so as to reduce the leakage flux to a small proportion as compared with the flux passing through the closed magnetic path. Thus there is no possibility of any detection difficulty.

Figure 3:
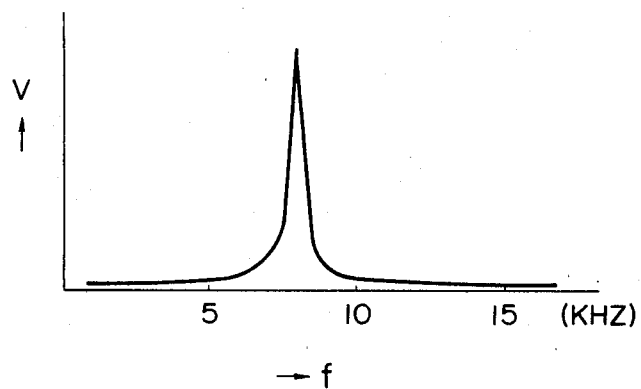
FIGS. 3 and 4 are output characteristic diagrams of the detecting apparatus shown in FIGS. 2A and 2B.

The four vibrating reeds 21a of the vibrating member 21a have the same predetermined width and length. All the vibrating reeds 21a are adjusted to resonate at substantially the same frequency (8 kHz which is substantially in the middle of the frequency range of 7 to 10 kHz). As a result, the knock detection sensitivity is especially improved at this particular frequency and the sensitivity to signals of other frequencies is relatively deteriorated, thus greatly improving the S/N ratio in knock detection. The use of the plurality of the vibrating reeds 21a has the effect of decreasing the reluctance of the vibrating member 21 and increasing its output. FIG. 3 shows an output characteristic diagram of the detecting apparatus. Since the four vibrating reeds 21a have substantially the same resonant frequency, a single resonant characteristic is obtained at around 8 kHz. From this characteristic diagram it will be apparent that the S/N ratio is improved. Of course, a very similar characteristic can be obtained with the use of only a single vibrating reed.

Figure 4:
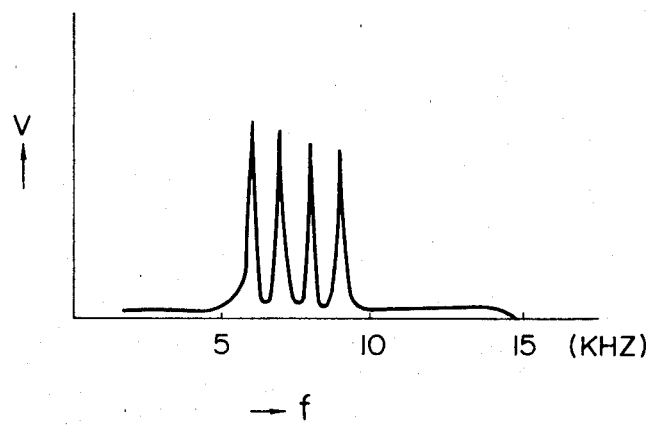

FIG. 4 shows another output characteristic obtained when the four vibrating reeds 21a have different resonant characteristics. This detecting apparatus detects changes of the magnetic flux in the magnetic path and thus a composite value of the magnetic flux changes is detected. Thus, if the vibrating reeds 21a have different lengths and hence different vibration characteristics, any desired plurality of resonant frequencies will be obtained. In this way, even if the knocking frequency varies, knocking can be detected at different frequencies with improved S/N ratio. The vibrating member 21 of the first embodiment is manufactured by cutting, stamping and shaping a magnetic plate and any desired resonant characteristic is obtainable by a simple technique. This resonant frequency will now be described in greater detail. The natural frequency of each vibrating reeds 21a is generally dependent on its material, shape and thickness. In the case of FIG. 4, the vibrating reeds 21a have the same thickness but are different in length to have different resonant characteristics. To select the resonant characteristics corresponding to the knocking frequencies denotes that the sensitivity to these frequencies is improved especially but it is deteriorated with respect to vibration noise generated at other frequencies with the resulting great improvement in the S/N ratio, and thus this is effective in preventing any malfunctioning of the detecting apparatus and improving its sensitivity thereby ensuring detection of very weak knocking. Also in this detecting apparatus the attractive force produced by the magnet acts in the gaps G and thus the vibrating member 21 is provided with a damping characteristic by means of the magnetic force. This means that as soon as the knocking is terminated (the knocking occurs at a particular crank angle as mentioned previously), the magnetic force acts in a direction to stop the vibration of the vibrating reeds 21a and thus there is the effect of causing the detecting apparatus 2 to generate an output in the frequency range where there is knocking. The effectiveness of this damping characteristic increases with an increase in the magnetic force.

Figure 5:
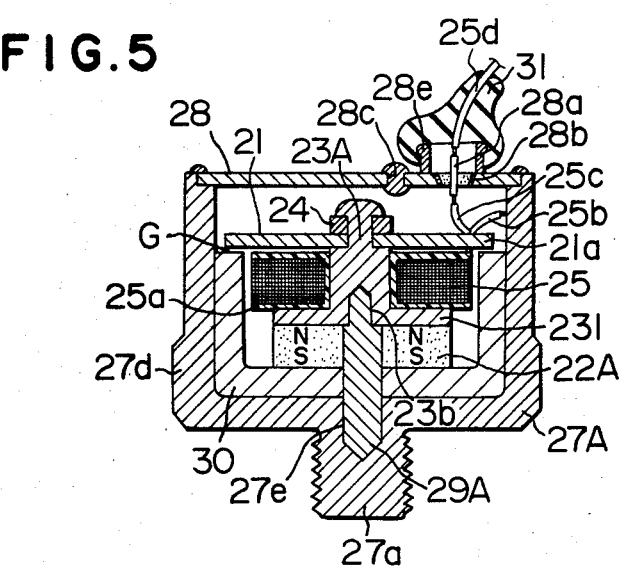
FIG. 5 is a longitudinal sectional view showing a second embodiment of the detecting apparatus according to the invention.
Figure 6A:
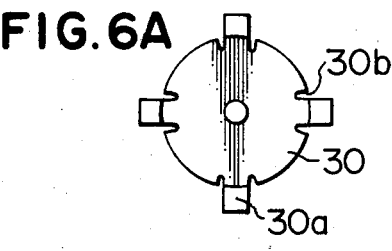
FIGS. 6A and 6B are respectively a front view and side view of the magnetic material used in the second embodiment of FIG. 5.
Figure 6B:
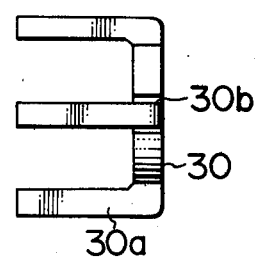

Further, while, in the first embodiment, the magnet 22 is magnetized along the inner and outer peripheral surfaces of the disk, in the second embodiment of the invention shown in FIG. 5 a magnet is used which is magnetized in the vertical direction of the disk. In the Figure, the same reference numerals as used in FIG. 2 designate the same or equivalent component parts. Numeral 23A designates a bar magnetic member made of the same material as the counterpart of the first embodiment and including a circular collar 231 in the lower part. Numeral 22A designates a disk magnet formed with a hole through its center and magnetized in the vertical direction, and 29A a non-magnetic supporting member. Numeral 30 designates a magnetic member made of iron, iron-nickel alloy or the like and including four projections 30a as shown in FIG. 6. Numeral 27A designates a housing. In the second embodiment the use of the magnetic member 30 allows the use of a nonmagnetic material for the housing 27A. Also, the function of the magnetic member 30 may be concurrently served by the housing 27A as in the case of the first embodiment. The closed magnetic path is formed by the north pole of the magnet 22A, the magnetic member 23A, the vibrating member 21, the magnetic member 30 and the south pole of the magnet 22A. As a result, in the second embodiment the magnetic member 23A and the magnet 22A form the central magnetic path portion and the magnetic member 30 forms the diametrical magnetic path portion as well as the outer peripheral magnetic path portion. Since the component parts other than the vibrating member 21 are firmly secured to the housing 27A, in the same manner as in the case of the first embodiment, only the vibrating member 21 vibrates in response to knocking and the resulting output is take out through the housing 27A and the center electrode 28a of the sealed terminal 28b. In the case of the first embodiment, the stepped portion 27c of the housing 27 has a substantially flat surface and consequently the gap G has the effect of causing the magnetic flux in the housing 27 to extensively distribute in the magnetic path. In the second embodiment, as shown in FIG. 6, the projections 30a of the same width as the vibrating reeds 21a are arranged to face the latter so as to concentrate the magnetic flux in the gap G and thereby to improve the detection sensitivity. The magnetic member 30 is stamped out of a single plate material and the projections 30a are provided by bending. A notch 30b is formed on each side of the base portion of each projection 30a to facilitate its bending. The vibrating member 21 may be of the same type as used in the first embodiment. The detecting apparatus of this embodiment may be assembled by successively fitting and driving the supporting member 29A, the magnetic member 30, the magnet 22A and the magnetic member 23A in this order to the housing 27A or alternatively the apparatus may be assembled by first assembling and adjusting the internal structure of the housing 27A and then driving the supporting member 29A into the housing 27A. While the magnetic path is formed by the magnetic member 30 and the magnetic flux is concentrated by the projections 30a as mentioned previously, the same effect may be ensured by forming the stepped portion 27c (the gap portion) of the housing 27 of the first embodiment with parallel furrows and ridges corresponding to the vibrating reeds 21a and there will be no difficulty if the depth and width of the furrows are suitably designed. In the case of the second embodiment, however, it will be easier and better in mass productivity than the first embodiment to assemble and adjust the component parts externally of the housing 27A. Further, while, in FIG. 5, the sealing plate 28 is substantially the same in construction with the counterpart of the first embodiment, the plate 28 is provided with a metal support 28e on which is mounted a rubber bushing 31 fitted on the signal line 25d and in this way the sealed terminal 28a is protected from contamination and so on.

The operation of the second embodiment is the same with the first embodiment and the two embodiments differ only slightly in the construction of the magnetic path.

Figure 7:
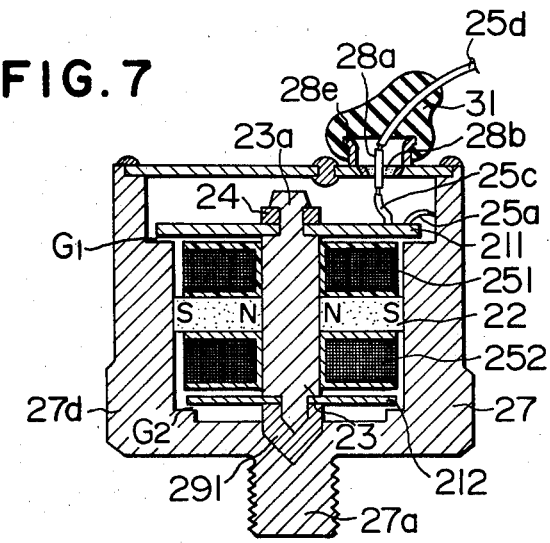
FIGS. 7 and 8 are longitudinal sectional views showing respectively third and fourth embodiments of the detecting apparatus according to the invention.

A third embodiment of the invention employing a pair of magnetic vibrating members will now be described with reference to FIG. 7. In the Figure, the same reference numerals as used in the first and second embodiments designate the same or equivalent component parts and therefore they will not be described. Numerals 211 and 212 designate plate vibrating members made of magnetic material and arranged respectively on the upper and lower sides of the magnetic member 23 and gaps $G_1$ and $G_2$ are respectively formed between them and the housing 27. Numerals 251 and 252 designate coils respectively mounted on the upper and lower parts of the magnetic member 23 and connected in series with each other with the magnet 22 being interposed between the coils 251 and 252. Numeral 291 designates a nonmagnetic supporting member, and the housing 27, the supporting member 291, the vibrating member 212, the magnetic member 23, the vibrating member 211 and the magnet 22 are firmly mounted in place by fitting or caulking and the vibrations caused by knocking are transmitted to the vibrating members 211 and 212. Each of the vibrating members 211 and 212 includes four vibrating reeds thus providing a total of eight resonant characteristics. Of course, the number of vibrating reeds may be increased to obtain any desired resonant frequencies. This third embodiment is advantageous in that the space defined by the magnet 22 and the bottom wall of the housing 27 is utilized effectively so as to increase the number of turns in the coils 251 and 252, respectively, and thereby to increase the output voltage. However, it is necessary to arrange so that the outputs of the coils 251 and 252 are in the same phase. Thus there result two magnetic paths, one formed by the north pole of the magnet 22, the upper part of the magnetic member 23, the upper vibrating member 211, the housing 27 and the south pole of the magnet 22 and the other formed by the north pole of the magnet 22, the lower part of the magnetic member 23, the lower vibrating member 212, the housing 27 and the south pole of the magnet 22. It is also designed so that the flux leakage to the outside of the magnetic paths is reduced to a value which is sufficiently small as compared with the magnetic flux in the magnetic paths so as to be practically neglected. As in the case of the first and second embodiments, the knock-induced vibrations are transmitted to the vibrating members 211 and 221 by way of the housing 27, the supporting member 291 and the magnetic member 23, so that changes in the magnetic reluctance of the gaps $G_1$ and $G_2$ are detected by the coils 251 and 252 and the resulting output is taken out by the single signal line 25d. Also gas is sealed into the apparatus.

Figure 8:
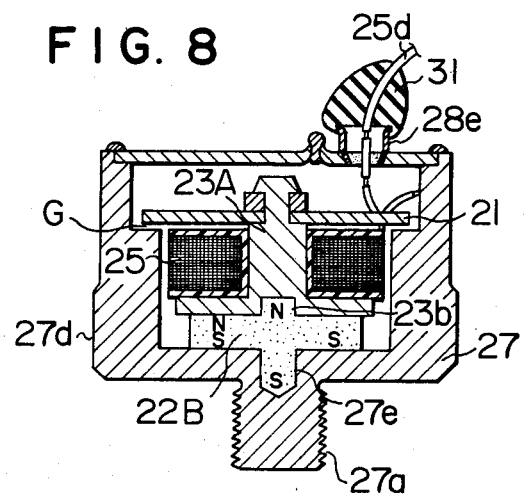

FIG. 8 shows a fourth embodiment of the invention which differs from the second embodiment of FIG. 5 in that the magnetic member 30 is eliminated by means of the housing 27 adapted to form the diametrical magnetic path portion and the outer peripheral magnetic path portion, that a magnet 22B is formed with a projection on each of its upper and lower sides, and that the projections of the magnet 22B are directly fitted in recesses 23e and 27e of the magnetic member 23 and the housing 27 to eliminate the supporting member and thereby to decrease the number of the component parts used.

As will be seen from the embodiments described hereinabove, the housing is hermetically sealed and an inert gas is contained in the housing thus practically completely eliminating the effects of the ambient humidity on the detecting apparatus.

Figure 9A:
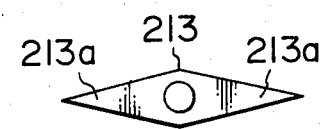
FIGS. 9A, 9B and 9C and FIGS. 10A and 10B are front views showing another embodiment of the vibrating means used with the embodiments of the invention.
Figure 9B:
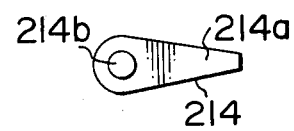
Figure 9C:
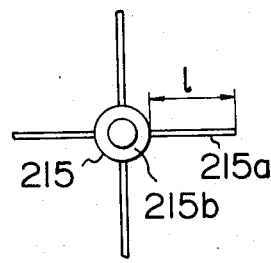

FIGS. 9 and 10 show another forms of the vibrating member. In each of the embodiments described above, due to the ease of its manufacture and low cost, the vibrating member is prepared by working a flat plate magnetic material and it is roughened. However, the vibrating member used with the detecting apparatus of this invention is in no way limited by its shape and manufacturing process provided that it is made of a magnetic material. FIG. 9A shows a vibrating member 213 in plate form comprising two triangular vibrating reeds 213a which are arranged in opposition to each other, and the fact that the width of each vibrating reed is decreased toward the end means that it is equivalent to one which is effectively shorter in length with the resulting increase in the resonant frequency. FIG. 9B shows a plate vibrating member 214 comprising a single vibrating reed 214a to be resonant at a single frequency and the vibrating member 214 is fixedly mounted on the magnetic material 23 by means of a hole 214b. FIG. 9c shows a vibrating member 215 comprising four vibrating reeds 215a each consisting of a round rod which is driven into the side wall of a ring base 215b having holes. The base 215b has a sufficient strength and consequently the resonant frequency of each vibrating reed 215a is determined by the length l of its moving part.

Figure 10A:
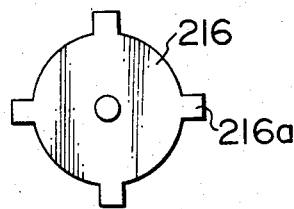
Figure 10B:
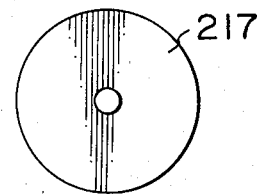

FIGS. 10A and 10B show vibrating members 216 and 217 which are in disk form. The vibrating member 216 of FIG. 10A comprises four vibrating reeds 216a each consisting of a projection so as to be resonant at a plurality of frequencies. The vibrating member 217 of FIG. 10B is resonant at a single frequency and its outer periphery is formed into a perfect circular shape.

The use of these types of vibrating members is not limited by the number of resonant frequencies and their shape and magnetic material and any one of these types can be used.

While, in the embodiments described above, the magnet 22 or 22A is used as a means of supplying a magnetic force to the magnetic path, an electromagnet may be provided by a coil and a magnetic member. However, this results in an increase in the number of output terminals.

Further, if, in the first embodiment, the magnet 22 is replaced with a magnetic member and the input of the coil 25 is connected to an oscillator, when the vibrating member vibrates so that the magnetic reluctance of the magnetic path varies and the load varies, the vibration can be detected as a change of the oscillation intensity from the output of the oscillator.

Further, since the present invention detects the vibration of the vibrating member as a change in the magnetic flux, any magnetic sensing means may be used provided it is capable of sensing a change in the magnetic flux. For example, a magneto-resistance element, Hall element or the like which is responsive to magnetic force may be disposed in the vicinity of the gap G, $G_1$ or $G_2$. However, it is necessary to select one which operates stably at the working temperature of 100° to 120° C.

We claim:

1. A knock detecting apparatus for internal combustion engines comprising:
   housing means made of a magnetic material and formed into substantially a cylindrical shape;
   magnetic path means including a central magnetic path portion disposed substantially centrally in said housing means to extend in the longitudinal direction thereof, a plurality of vibrating reeds made of a magnetic material and attached to and extending radially outward from said central portion, and a diametrical magnetic path portion disposed to extend from said central magnetic path portion in the diametrical direction of said housing means at a predetermined distance from said vibrating means, said side peripheral wall of said housing means forming an outer peripheral magnetic path portion disposed to extend from an outer peripheral side of said diametrical magnetic path portion toward ends of said reeds opposite said central portion so as to form gaps therebetween; and
   magnetic flux sensing means disposed in said housing means to sense a change in the magnetic flux passing through said magnetic path means.

2. An apparatus as set forth in claim 1, wherein said magnetic flux sensing means includes a coil wound on the outer surface of said central magnetic path portion between said reeds and said diametrical magnetic path portion, and each of said reeds has a different resonant frequency.

3. An apparatus as set forth in claim 1, wherein said housing means includes a bottom wall portion forming said diametrical magnetic path portion.

4. An apparatus as set forth in claim 1, 2 or 3, wherein said diametrical magnetic path portion includes a magnet magnetized along an inner periphery and an outer periphery thereof.

5. An apparatus as set forth in claim 1, 2 or 3, wherein at least part of said central magnetic path portion includes a magnet magnetized in an axial direction thereof.

6. A knock detecting apparatus for an internal combustion engine comprising:
   a cylindrical housing made of a magnetic material to be mounted on an engine, said housing having a bottom and a shoulder portion extending radially in said housing;
   a magnetic bar fixed within and to said housing in such a manner that said bar extends longitudinally from said bottom of said housing toward the other end of said housing;
   a ring-shaped permanent magnet disposed in said housing annularly about said magnetic bar;
   a plurality of vibrating reeds made of a magnetic material, each of said reeds having a different resonant frequency, an end of each of said reeds being fixed to one end of said magnetic bar to extend radially therefrom and another end of each of said reeds forming a gap relative to said shoulder portion of said housing in a longitudinal direction; and
   a coil wound about said magnetic bar for detecting a change in the magnetic flux passing through said magnetic bar.

7. A knock detecting apparatus as set forth in claim 6, wherein:
   said housing has another shoulder portion extending radially in said housing; and
   said apparatus further comprises a further plurality of vibrating reeds made of a magnetic material, each having one end fixed to said magnetic bar on a side of said permanent magnet opposite said plurality of reeds, said further plurality of reeds extending radially from said magnetic bar, each of said further reeds having another end forming an air gap relative to said another shoulder portion of said housing in a longitudinal direction thereof, said further reeds having different resonant frequencies.

* * * * *